United States Patent
Isogawa et al.

(10) Patent No.: US 12,421,838 B2
(45) Date of Patent: Sep. 23, 2025

(54) WALL DETECTION DEVICE, TRANSPORT VEHICLE, AND WALL DETECTION METHOD

(71) Applicants: KABUSHIKI KAISHA TOSHIBA, Tokyo (JP); Toshiba Infrastructure Systems & Solutions Corporation, Kawasaki (JP)

(72) Inventors: Kenzo Isogawa, Tokyo (JP); Toshiyuki Ono, Kawasaki (JP)

(73) Assignees: KABUSHIKI KAISHA TOSHIBA, Tokyo (JP); Toshiba Infrastructure Systems & Solutions Corporation, Kawasaki (JP)

(*) Notice: Subject to any disclaimer, the term of this patent is extended or adjusted under 35 U.S.C. 154(b) by 357 days.

(21) Appl. No.: 17/682,212

(22) Filed: Feb. 28, 2022

(65) Prior Publication Data

US 2023/0083322 A1     Mar. 16, 2023

(30) Foreign Application Priority Data

Sep. 15, 2021    (JP) .................................. 2021-150413

(51) Int. Cl.
   E21B 47/002    (2012.01)
   E21B 47/085    (2012.01)

(52) U.S. Cl.
   CPC ........ *E21B 47/0025* (2020.05); *E21B 47/085* (2020.05); *E21B 2200/20* (2020.05)

(58) Field of Classification Search
   CPC .............. E21B 47/0025; E21B 47/085; E21B 2200/20; G06V 10/431; G06V 10/766;
   (Continued)

(56) References Cited

U.S. PATENT DOCUMENTS 9,102,055 B1 *   8/2015   Konolige ............... B25J 9/1612
9,828,094 B2 *  11/2017   McMillion ............. B64U 50/38
(Continued)

FOREIGN PATENT DOCUMENTS

JP        2016-212086        12/2016

OTHER PUBLICATIONS

Fischler et al., "Random Sample Consensus: A Paradigm for Model Fitting with Applications to Image Analysis and Automated Cartography", Communications of the ACM, vol. 24, No. 6, 1981, 15 pages.

(Continued)

*Primary Examiner* — Tung S Lau
(74) *Attorney, Agent, or Firm* — Oblon, McClelland, Maier &Neustadt, L.L.P.

(57) ABSTRACT

According to one embodiment, a wall detection device includes an acquirer and processing circuitry. The acquirer acquires a point cloud, which includes a series of coordinates of a plurality of points corresponding to a first wall and a second wall that oppose each other. The processing circuitry detects a first detected wall and a second detected wall based on a model and the acquired point cloud, the model representing a first plane which corresponds to the first detected wall and indicates a surface of the first wall and a second plane which corresponds to the second detected wall and indicates a surface of the second wall, and the model representing the first plane and the second plane being parallel to each other.

13 Claims, 12 Drawing Sheets

(58) Field of Classification Search
CPC ......... G06V 20/58; B66F 9/0755; B66F 9/24; B66F 9/063
See application file for complete search history.

(56) References Cited

U.S. PATENT DOCUMENTS

| | | | |
|---|---|---|---|
| 10,013,754 B2* | 7/2018 | Douglas | G06T 7/0004 |
| 2006/0045406 A1* | 3/2006 | Iwamoto | G01P 3/443 |
| | | | 324/207.2 |
| 2021/0148709 A1* | 5/2021 | Kumar | G01S 7/4802 |

OTHER PUBLICATIONS

Office Action issued Nov. 26, 2024 in Japanese Patent Application No. 2021-150413 (with machine generated English translation).

* cited by examiner

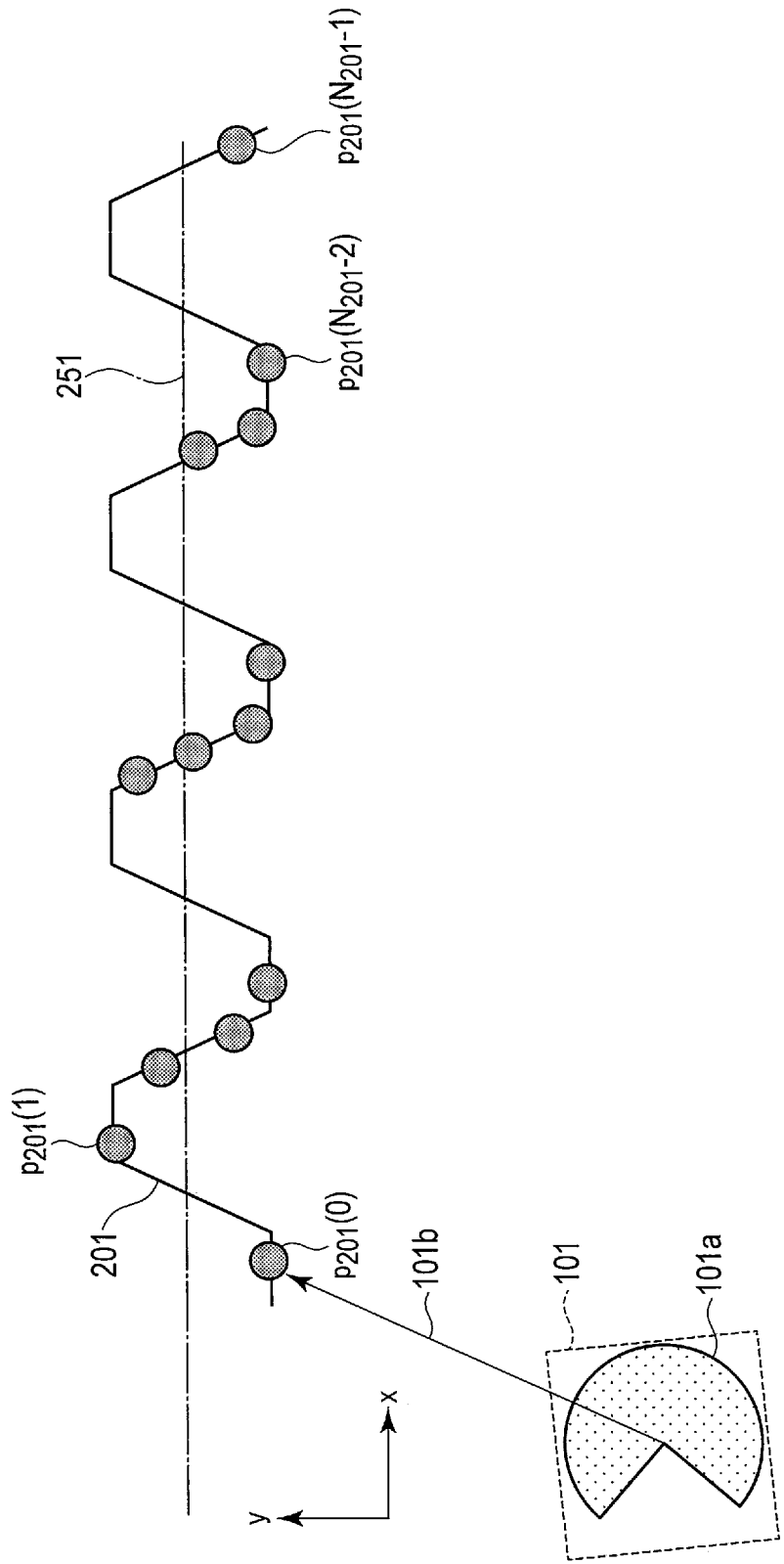
F I G. 3

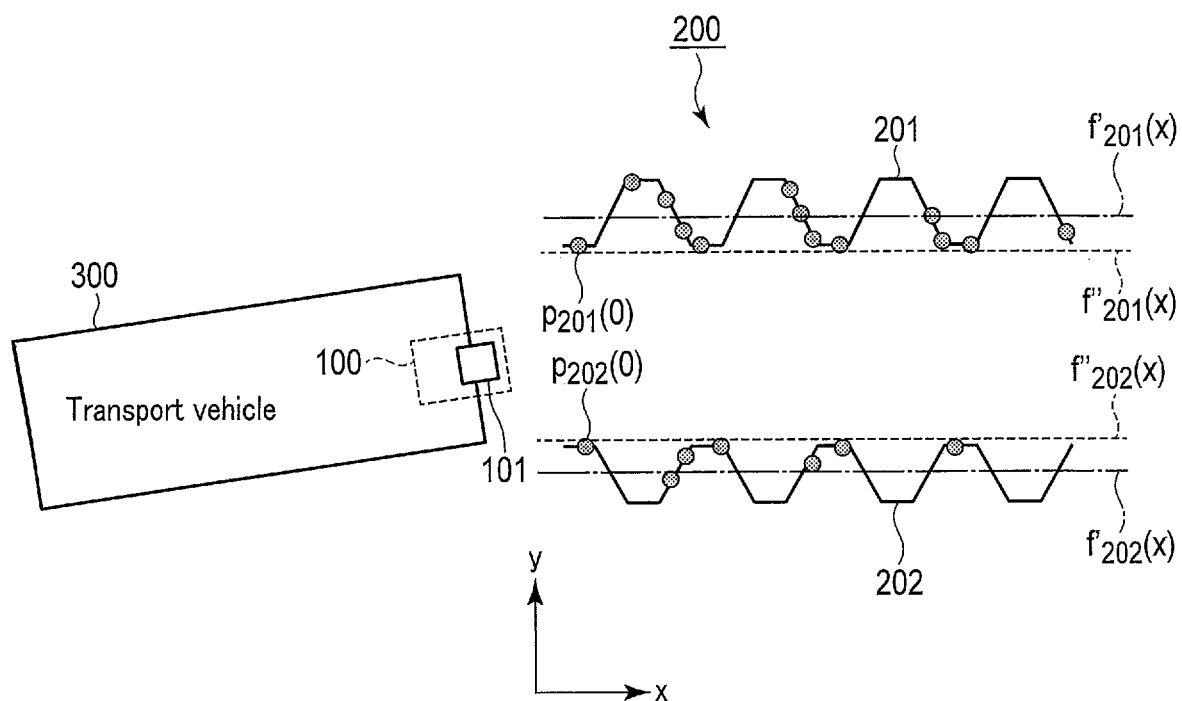
F I G. 7

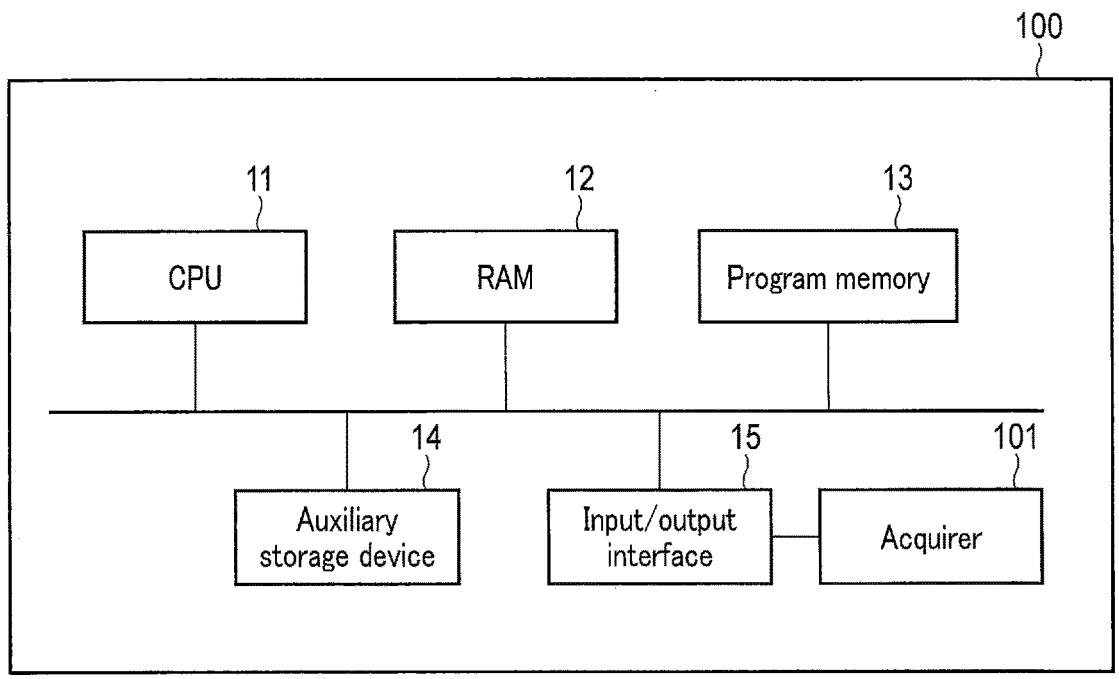
F I G. 14
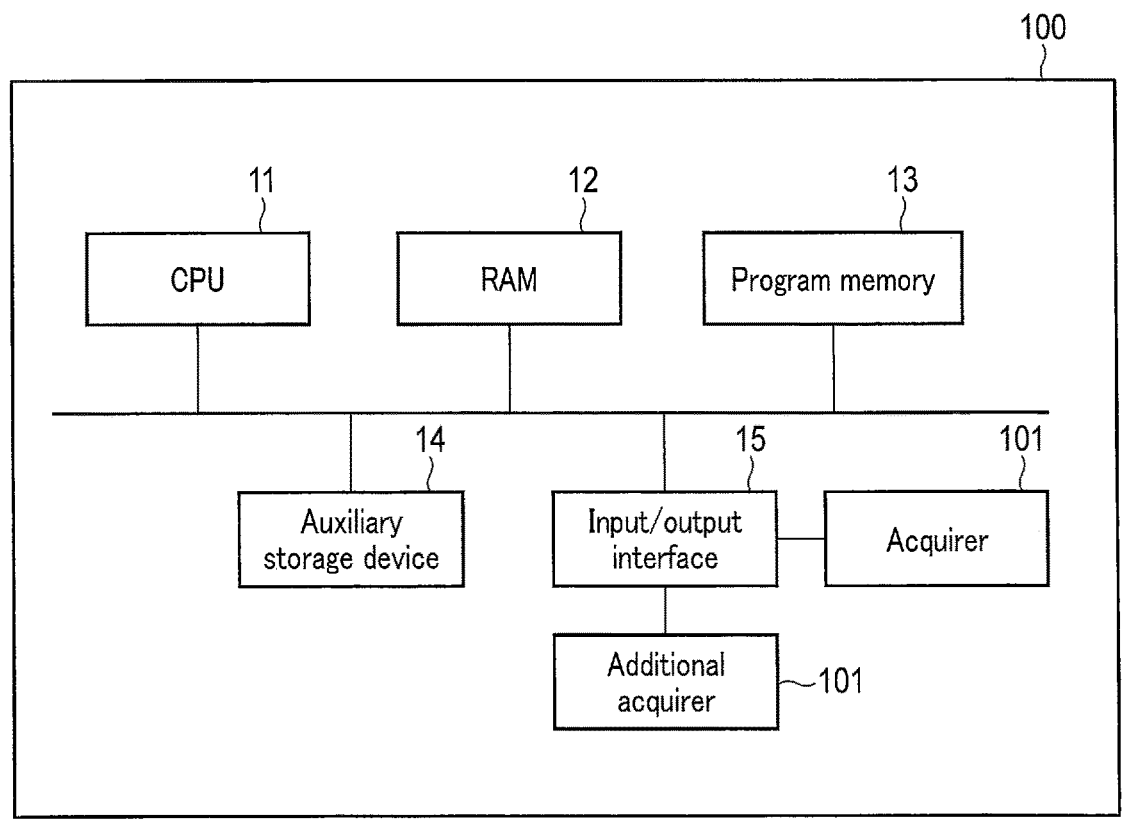
F I G. 15

WALL DETECTION DEVICE, TRANSPORT VEHICLE, AND WALL DETECTION METHOD

CROSS-REFERENCE TO RELATED APPLICATIONS

This application is based upon and claims the benefit of priority from Japanese Patent Application No. 2021-150413, filed Sep. 15, 2021, the entire contents of which are incorporated herein by reference.

FIELD

Embodiments described herein relate generally to a wall detection device, a transport vehicle, and a wall detection method.

BACKGROUND

Among large transport vehicles, vanning robots capable of transporting cargo and equipped with a loading robot arm and a transport conveyor have been known. A transport vehicle of this type can enter an area surrounded by side walls of containers and an aisle or the like and transport the cargo to the entered area by means of the conveyor and robot arm, which can efficiently enhance automation of distribution and labor saving. As transport vehicles of a different type, forklifts have also been known, which can enter an area surrounded by side walls of containers and an aisle or the like and transport cargo to the entered area by means of an ascending and descending fork.

Due to the upsizing of these transport vehicles, the risk of accidental contact with containers and aisle walls may increase. For this reason, a transport vehicle may be equipped with a wall detection device having a sensor such as a laser range finder (LRF). A wall detection device performs a wall detection, through which the distances between the sensor and respective side walls are detected and parameters indicating the wall surfaces are output, thereby reducing the risk of contact with a wall surface. Such a wall detection device is required to produce wall surface parameters at a higher accuracy as the distance between the wall surfaces becomes closer to the width of the transport vehicle and as the transport vehicle and aisle become longer.

The container and aisle walls, however, may not always have simple geometries. For instance, a container wall may be formed with a corrugated panel in order to increase the rigidity. The aisle wall may have protrusions such as door knobs and handrails. It is therefore impossible to model in advance the accurate geometries of various types of wall surfaces.

In view of the above, a wall detection device that can reduce the risk of an accidental contact with a wall surface when entering an area surrounded by wall surfaces which may not have a simple geometry is desired.

BRIEF DESCRIPTION OF THE DRAWINGS

FIG. 3 is a schematic diagram explaining an acquirer according to the first embodiment.

FIG. 7 is a schematic diagram explaining the operation according to the first embodiment.

FIG. 14 is a block diagram showing the hardware configuration of a wall detection device according to the third embodiment.

FIG. 15 is a block diagram showing the hardware configuration of a wall detection device according to a modification example of the third embodiment.

DETAILED DESCRIPTION

In general, according to one embodiment, a wall detection device includes an acquirer and processing circuitry. The acquirer acquires a point cloud, which includes a series of coordinates of a plurality of points corresponding to a first wall and a second wall that oppose each other. The processing circuitry detects a first detected wall and a second detected wall based on a model and the acquired point cloud, the model representing a first plane which corresponds to the first detected wall and indicates a surface of the first wall and a second plane which corresponds to the second detected wall and indicates a surface of the second wall, and the model representing the first plane and the second plane being parallel to each other.

Hereinafter, embodiments of the present invention will be described with reference to the drawings. In the following explanation, a corrugated panel is adopted as an exemplary wall surface having a complex geometry. A corrugated panel has a cross section having protrusions and depressions at regular intervals, which may be used for containers and the like. The lengths of the protrusions and depressions of the corrugated panel are determined in accordance with the outside and inside dimensions of a container. The outside and inside dimensions of the container may conform to the International Organization for Standardization (ISO). The lengths of the protrusions and depressions of the corrugated panel in the container are unknown; however, they may be estimated from the difference between the outside and inside dimensions.

First Embodiment

Figure 1:
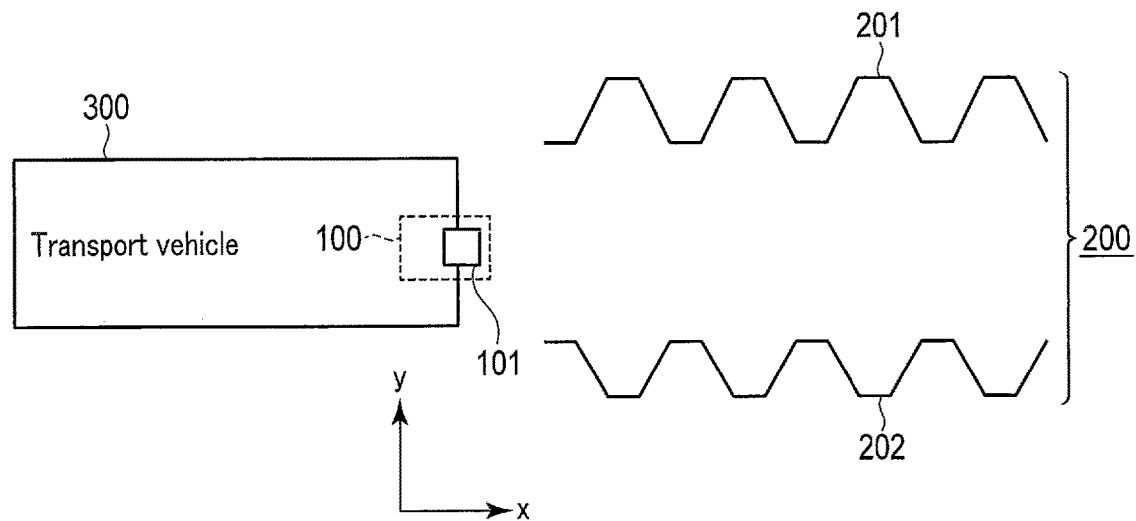
FIG. 1 is a plan view showing a transport vehicle equipped with a wall detection device according to the first embodiment and the state of use of the vehicle.

FIG. 1 is a plan view showing a transport vehicle equipped with a wall detection device according to the first embodiment and the state of use of this vehicle. A wall detection device 100 is mounted on a transport vehicle 300, which approaches the rear of a container 200 having side walls 201 and 202 formed of corrugated panels having a horizontal cross section with projections and depressions. The wall detection device 100 is provided with an acquirer 101, which is arranged at the center of the leading end of the transport vehicle 300 in its traveling direction.

Figure 2:
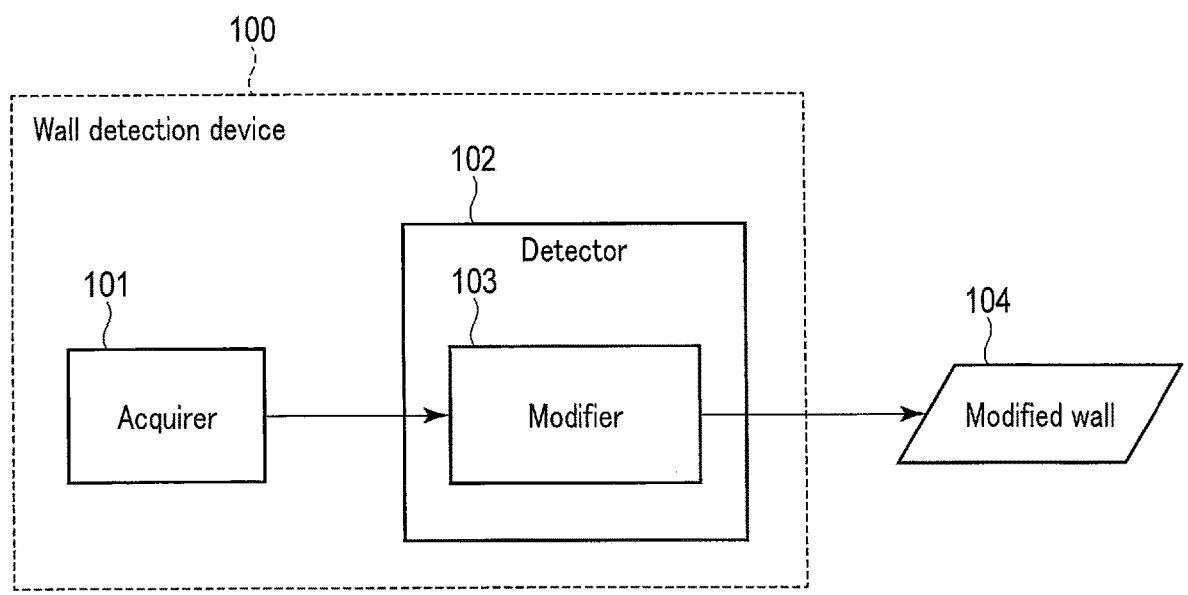
FIG. 2 is a block diagram showing the configuration of the wall detection device according to the first embodiment.

As illustrated in FIG. 2, the wall detection device 100 is provided with an acquirer 101 for acquiring a point cloud, which includes a series of coordinates representing the surface of the walls, and a detector 102 for detecting two parallel wall surfaces from the point cloud. The detector 102 includes a modifier 103. The modifier 103 modifies the positions of detected walls, which are two detected wall surfaces, to positions in a range in which the transport vehicle 300 can move without making contact with the wall surfaces, thereby obtaining modified walls 104.

In particular, the acquirer 101 acquires a point cloud, i.e., a series of coordinates of points corresponding to the first wall and second wall that oppose each other. The acquirer 101 may include an optical sensor, for example. This sensor casts a measurement light onto an object (wall) and receives a reflection light from the object to measure the distance between the sensor and the object. As an optical sensor of the acquirer 101, a laser range finder (LRF) capable of acquiring a point cloud including a series of two-dimensional coordinates, or a time-of-flight (ToF) camera capable of acquiring a point cloud including a series of three-dimensional coordinates may be adopted as needed. The acquirer 101 is not limited to an optical sensor, but may be an ultrasonic sensor. Such a sensor may transmit an ultrasonic wave to an object (wall) and receive a reflection wave from the object to measure the distance between the sensor and object. In this embodiment, the acquirer 101 provided with a laser range finder (LRF) will be discussed as an example. For instance, as illustrated in FIG. 3, the laser range finder 101a of the acquirer 101 applies laser light 101b to the surroundings while changing the application angle with respect to the horizontal direction. The laser light 101b reaches the very back of the depression of the side wall 201 (first wall) on the side closer to the laser range finder 101a, while it reaches only the portion shallower than the center line 251 of the projections and depressions on the side farther away from the laser range finder 101a. The applied laser light 101b is reflected on points $p_{201}(0)$, $p_{201}(1)$, $p_{201}(N_{201}-2)$, and $p_{201}(N_{201}-1)$ on the surface of the side wall 201. The laser range finder 101a receives this reflection light, and measures the relative distances between the respective points $p_{201}$ and the laser range finder 101a. Hereinafter, a series of coordinates of points obtained from pairs of relative distances and application angles will be referred to as a point cloud. With reference to an application angle straight ahead of the traveling direction, a point cloud at an application angle to the left of the direction corresponds to the side wall 201 (first wall), whereas a point cloud at an application angle to the right of the direction corresponds to the side wall 202 (second wall). The explanation of the side wall 201 is applicable to the side wall 202, simply by changing the reference numeral 201 to 202. The acquirer 101 may also be referred to as a group-of-points acquirer.

Based on the acquired point cloud and a model that represents the first plane indicating a geometry of the first wall and the second plane indicating a geometry of the second wall and also represents the first plane and second plane being parallel to each other, the detector 102 detects a first detected wall corresponding to the first plane and a second detected wall corresponding to the second plane. If the point cloud includes a series of two-dimensional coordinates, the model may represent the first plane and second plane being parallel to each other when the inclination of the first line indicating the horizontal cross section of the first plane and the inclination of the second line indicating the horizontal cross section of the second plane are equal to each other.

Furthermore, the detector 102 detects the first plane from multiple points corresponding to the first wall and the second plane from multiple points corresponding to the second wall, and corrects the first plane and second plane so as to become parallel to each other, thereby obtaining the first detected wall and second detected wall.

In particular, the detector 102 sorts the points in the point cloud acquired by the sensor into the first point cloud of points located within a predetermined distance from the first plane and the second point cloud of points located within a predetermined distance from the second plane, and associates the points in the first point cloud with the first wall and the points in the second point cloud with the second wall. Furthermore, based on the first point cloud, the second point cloud, and the model, the detector 102 obtains the first detected wall and the second detected wall. The predetermined distance is preferably larger than or equal to the value of either the tolerance of the sensor or the designed length of the projections and depressions in the first wall and second wall, whichever is larger. For instance, the predetermined distance may be the larger one of the tolerance or the length of the projections and depressions, or may be a value obtained by adding the tolerance to the length. Alternatively, the predetermined distance may be a value obtained by multiplying the added value of the tolerance and the length by a constant (e.g., by doubling).

To be more specific, it is difficult to identify which wall the point cloud acquired by the sensor or laser range finder 101a is reflected from. For this reason, the random sample consensus (RANSAC) is adopted to perform in parallel the detection of the container walls and association of points with the detected walls. For this association, an index for a variation range of points obtained from reflection on a wall will be required. Thus, an index is provided as a range of a predetermined distance (maximum distance Lmax, which will be described later).

The modifier 103 modifies the first detected wall to a first modified wall by moving the first detected wall in parallel toward the second detected wall, and modifies the second detected wall to the second modified wall by moving the second detected wall in parallel toward the first detected wall. Here, the number of points in the point cloud between the first modified wall and second modified wall is smaller than the number of points in the point cloud between the first detected wall and second detected wall. In FIG. 2, the modified wall 104 includes the first modified wall and second modified wall. The modifier 103 may move the first detected wall in parallel, for example to the position farthest from the first wall on the second detected wall side among the points corresponding to the first wall. Similarly, the modifier 103 may move the second detected wall in parallel, for example to the position farthest from the second detected wall on the first detected wall side among the points corresponding to the second wall. The method of moving the first detected wall and second detected wall in parallel, however, is not limited thereto.

The transport vehicle 300 is a self-propelled transport device equipped with the wall detection device 100. In particular, the transport vehicle 300 is self-propelled not only in a large area such as a warehouse but also in a walled area inside a container or through an aisle, while carrying cargo. As a transport vehicle 300, a vehicle such as a vanning robot and forklift equipped with a cargo handling machine such as a robot arm or fork may be suitably adopted. A vanning robot is a cargo carrying vehicle provided with a loading robot arm and a carrying conveyor. The transport vehicle 300 may be provided with a controller for controlling the traveling direction (orientation of the wheels) based on the first and second detected walls (or first and second modified walls) acquired by the wall detection device 100. The controller may control the traveling direction in such a manner that the wheel center axis extending in the longitudinal direction (front-rear direction) of the transport vehicle 300 runs in the middle between the two wall surfaces and in parallel to the wall surfaces. With such a controller, the manipulator of the transport vehicle 300 only needs to input a command to move forward or backward without needing to steer in order to drive the transport vehicle 300 forward or backward.

Next, the operations of the above-configured wall detection device and transport vehicle will be described with reference to the flowcharts of FIGS. 4 and 5 and schematic diagrams of FIGS. 6 and 7. The overall operation will be discussed first, and then exemplary operations will be discussed.

Figure 4:
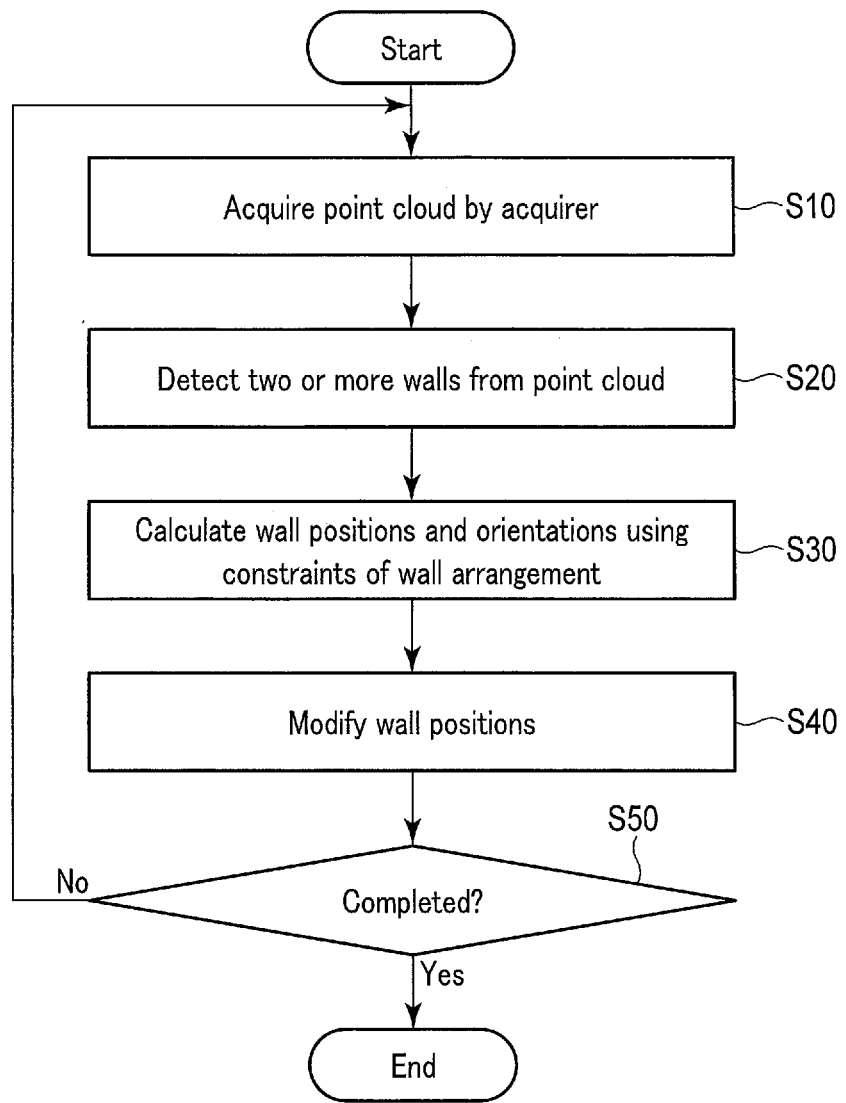
FIG. 4 is a flowchart explaining the operation according to the first embodiment.

(Overall operation) The acquirer 101 of the wall detection device 100 acquires a point cloud, which is a set of coordinates of the points from the surfaces of the side walls 201 and 202, for example by means of a sensor, as indicated in FIG. 4 (step S10).

After step S10, the detector 102 detects, with RANSAC, the initial locations and orientations of two or more walls from the point cloud (step S20).

After step S20, using the condition that the relative locations of the two or more walls satisfy a predetermined constraint, the detector 102 calculates (re-estimates) the locations and orientations of the two or more walls to obtain two or more detected walls (step S30). The detector 102 calculates the locations and orientations of walls based on the constraints of the arrangement of the walls so as to enhance the estimation accuracy of the wall locations and orientations.

After step S30, the modifier 103 modifies the relative positions of the two or more walls to obtain modified walls 104 (step S40). In this manner, the transport vehicle 300 can proceed between the modified walls 104. The amount of movement of the detected walls to obtain such modified walls 104 is determined to be a distance that sufficiently reduces the number of points in the point cloud in the area surrounded by the modified walls 104. Hence, by restricting the movable range of the transport vehicle 300 equipped with the wall detection device 100 to the area defined by the modified walls 104, the risk of the transport vehicle 300 coming into contact with the side walls 201 and 202 can be reduced when proceeding between the side walls 201 and 202.

After step S40, the wall detection device 100 determines whether or not the wall detection is completed (step S50), and the operations at steps S10 to S50 are repeated until the wall detection is completed. The completion of the wall detection may be determined, for example, when the distance between the laser range finder 101a and the wall ahead indicating a dead end is shorter than or equal to a threshold value based on the point cloud acquired by the acquirer 101. The determination is not necessarily limited to a detection of a dead end, but may be made upon input of a termination command according to the manipulator's operation.

(Exemplary operations) Next, exemplary operations will be discussed. The exemplary operations of steps S20, S30, and S40 in FIG. 4 are shown in steps S21, S31, and S41, respectively, in FIG. 5.

Figure 5:
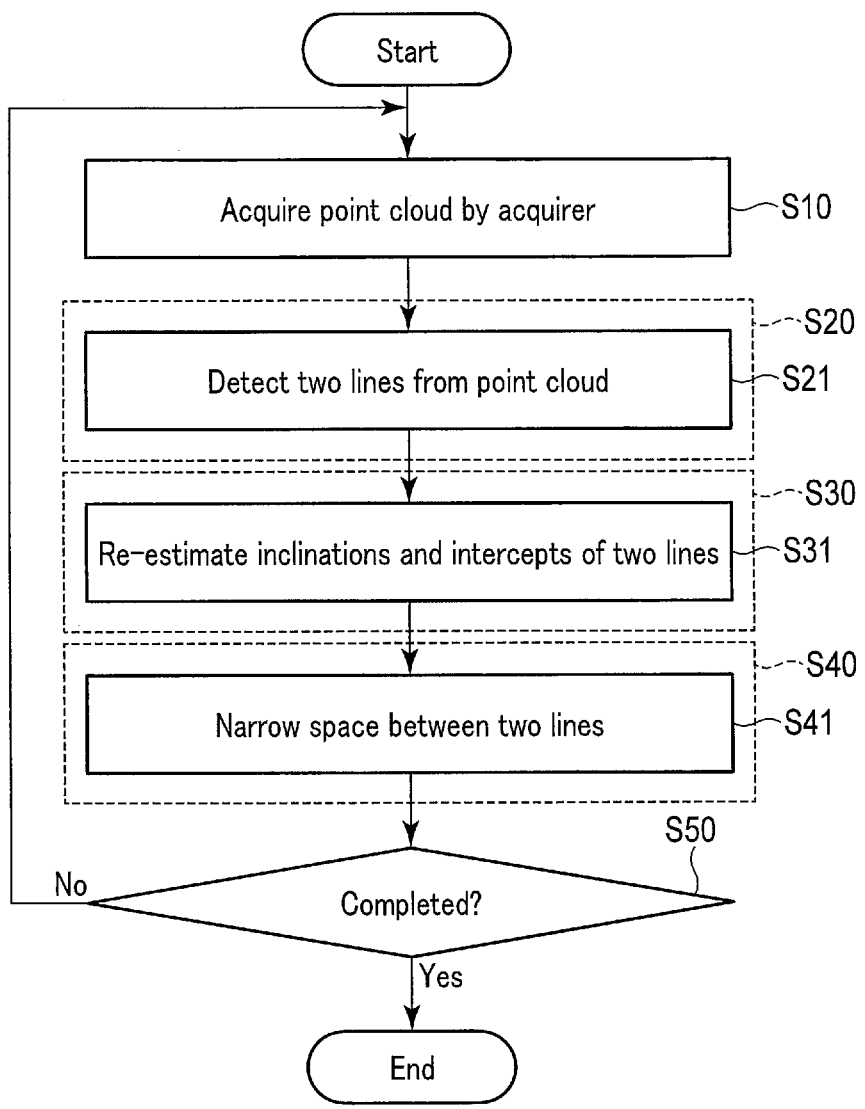
FIG. 5 is a flowchart showing a specific example of the operation according to the first embodiment.
Figure 6:
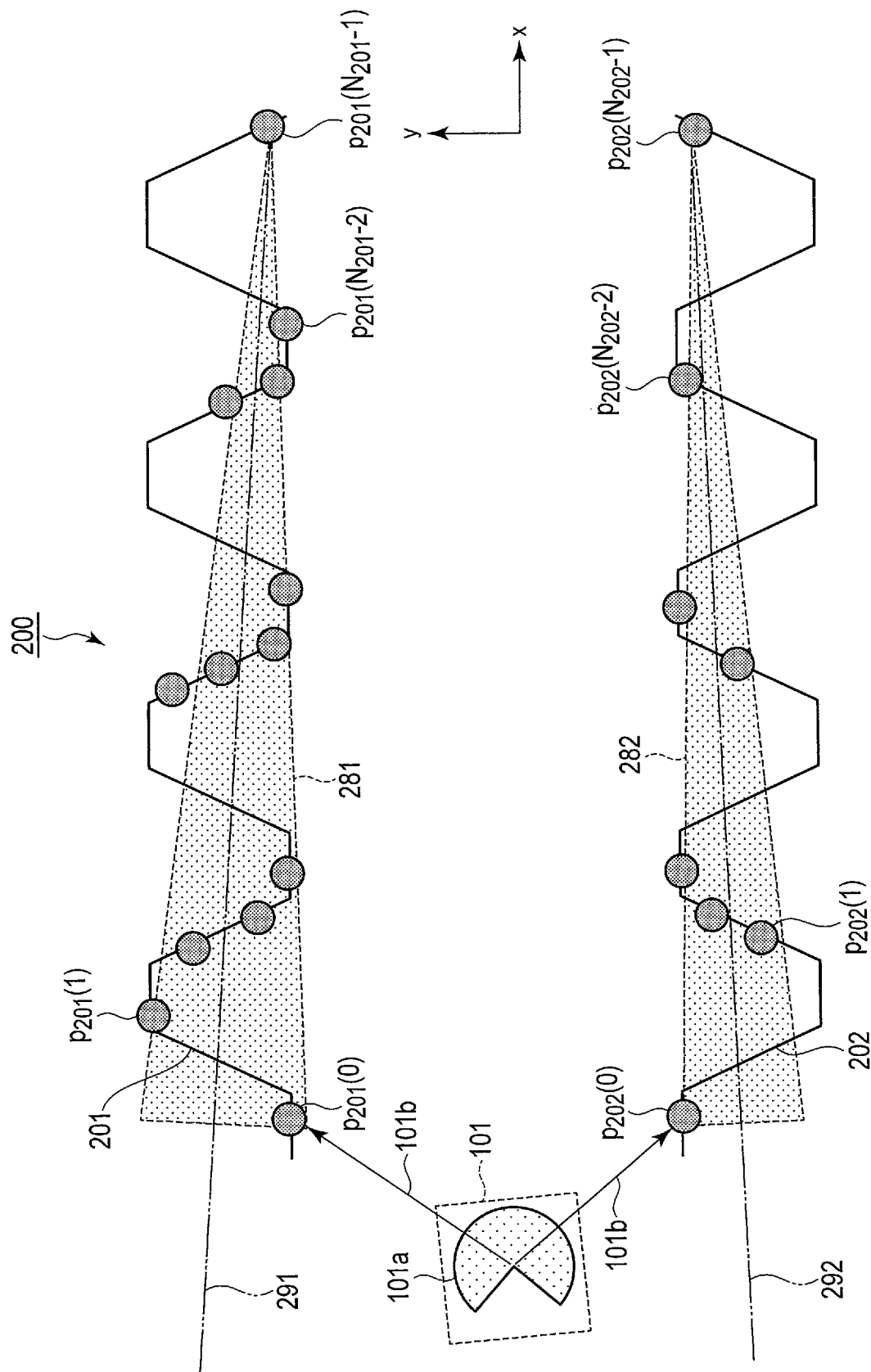
FIG. 6 is a schematic diagram explaining the operation according to the first embodiment.

The wall detection device 100 acquires a point cloud, which includes a series of coordinates of the points on the side wall 201 and side wall 202, from the laser range finder 101a that serves as an acquirer 101, as illustrated in FIG. 5 (step S10). Here, as illustrated in FIG. 6, how far back in the projections and depressions the laser light 101b can reach differs, depending on a combination of the projections/depressions of the side wall 201 and the application angle of the laser light 101b. In other words, the laser light 101b may reach the back of some projections and depressions, from which points near the front of projections including a point $p_{201}(0)$ and points in the back of depressions including a point $p_{201}(1)$ can be obtained, while the same laser light 101b may not reach the back of depressions, from which only points near the front of projections including a point $p_{201}(N_{201}-2)$ can be obtained. As a result, the distribution of the point cloud forms a triangle 281 with a larger width as the points become closer to the laser range finder 101a in accordance with the lengths of the projections and depressions in the side wall 201. Such a point cloud is acquired at step S10. The distribution pattern of points in the triangle 281 on the side wall 201 applies to that of points in the triangle 282 on the side wall 202. Although the distribution patterns in the triangles 281 and 282 are approximately the same, they actually form respective patterns in accordance with the extent of the laser light 101b reaching the projections and depressions in the side walls 201 and 202.

After step S10, the detector 102 obtains for each of the side walls 201 and 202, a set of points, which are the constituents of the point cloud, and a modeled line for the side wall 201/202 from the acquired point cloud, as expressed in Equations (1) to (4), using RANSAC (step S21). For the implementation of RANSAC, the maximum distance Lmax between the detected line and the corresponding points needs to be supplied to the detector 102 in advance. This maximum distance Lmax is preferably larger than or equal to a value of either the measurement error (tolerance) of the sensor to which a distance from the wall surface is supplied in advance or the length of the projections and depressions in the container wall surface, whichever is larger. If the maximum distance Lmax is smaller than this value, the container surface with projections and depressions will not be detected as one line, but will be divided into separate short lines.

If corrugated panels are adopted for the first wall and second wall, the designed lengths of the projections and depressions can be estimated in advance from the difference between the outside and inside dimensions based on the ISO standards. If the first wall and second wall form an aisle having projections such as a doorknob and handrail, the heights of the projections measured in advance may be adopted as designed heights of the projections and depressions.

$$p_{201}(i)=(x_{201}(i),y_{201}(i)),(i=0,\ldots,N_{201}-1) \qquad (1)$$

$$f_{201}(x)=a_{201}x+b_{201} \qquad (2)$$

$$p_{202}(j)=(x_{202}(j),y_{202}(j)),(j=0,\ldots,N_{202}-1) \qquad (3)$$

$$f_{202}(x)=a_{202}x+b_{202} \qquad (4)$$

In the above expression, $p_{201}(i)$ represents a set of points which are constituents of the point cloud corresponding to the side wall 201; $f_{201}(x)$ represents a modeled line for the location and orientation of the side wall 201; $p_{202}(j)$ represents a set of points which are constituents of the point cloud corresponding to the side wall 202; and $f_{202}(x)$ represents a modeled line for the location and orientation of the side wall 202.

The calculation of the lines $f_{201}(x)$ and $f_{202}(x)$ modeled on the side walls 201 and 202 is not limited to RANSAC, but can also be performed through regression analysis. If this is the case, the lines $f_{201}(x)$ and $f_{202}(x)$ correspond to regression lines 291 and 292 in FIG. 6. Since the regression line 291 runs at the center of the point cloud distributed over the triangle 281, the line does not coincide with the center line 251 of the projections and depressions in FIG. 3. The same applies to the regression line 292 for the side wall 202. The regression lines 291 and 292 each correspond to the triangles 281 and 282 having a geometry independent from each other, and an inclination independent from each other. The distance between the two regression lines 291 and 292 becomes larger as the lines become closer to the laser range finder 101a, and becomes smaller as the lines become farther away from the laser range finder 101a. That is, with the existing method, the distribution pattern of the point cloud forms a triangle in accordance with the relative positions of the laser range finder 101a and the container 200 and the lengths of the projections and depressions in the side walls 201 and 202, which results in an inverted V shape formed by the regression lines 291 and 292.

Under these conditions, when the transport vehicle 300 proceeds along the regression line 291, it may come into contact with the side wall 201 in the vicinity of the point $p_{201}(0)$. Even if the halting region for the transport vehicle 300 is defined with a line (not shown) obtained by moving the regression line 291 in parallel onto the point $p_{201}(0)$ in order to avoid such a contact, the halting region will become narrowed in the rear of the region in the vicinity of the point $p_{201}(N_{201}-2)$, which may obstruct the passage of the transport vehicle 300. The lines $f_{201}(x)$ and $f_{202}(x)$ obtained at step S21 are in the same situation as the aforementioned regression lines 291 and 292, and have inclinations $a_{201}$ and $a_{202}$ that differ from each other. Thus, in order to modify the inclinations $a_{201}$ and $a_{202}$ of the lines $f_{201}(x)$ and $f_{202}(x)$, they need to be modified in separate modification operations.

After step S21 in FIG. 5, the detector 102 models the side wall 201 and side wall 202 to two parallel lines $f'_{201}(x)$ and $f'_{202}(x)$, as expressed in Equations (5). These two lines $f'_{201}(x)$ and $f'_{202}(x)$ have the same inclination a' and different intercepts b'$_{201}$ and b'$_{202}$. By setting the values corresponding to the errors between the point cloud and respective lines $f'_{201}(x)$ and $f'_{202}(x)$ as $E_{201}$(a', b'$_{201}$) and $E_{202}$(a', b'$_{202}$), and the parameter E(a', b'$_{201}$, b'$_{202}$) of the inclination and intercepts of the two lines $f'_{201}(x)$ and $f'_{202}(x)$ most suitable for the point cloud as a cost function as expressed below in Equations (6) to (7), the detector 102 re-estimates (calculates) the parameter (A, $B_{201}$, $B_{202}$) that can minimize the cost as expressed in Equation (8) (step S31).

$$f'_{201}(x) = a'x + b'_{201} \quad (5)$$

$$f'_{202}(x) = a'x + b'_{202}$$

$$E_{201}(a', b'_{201}) = \left( \sum_{i=0}^{N_{201}-1} (y_{201}(i) - (f'_{201}(x_{201}(i))))^2 \right) \quad (6)$$

$$E_{202}(a', b'_{202}) = \left( \sum_{j=0}^{N_{202}-1} (y_{202}(j) - (f'_{202}(x_{202}(j))))^2 \right)$$

$$E(a', b'_{201}, b'_{202}) = E_{201}(a', b'_{201}) + E_{202}(a', b'_{202}) \quad (7)$$

$$(A, B_{201}, B_{202}) = \underset{a', b'_{201}, b'_{202}}{\mathrm{argmin}}\ E(a', b'_{201}, b'_{202}) \quad (8)$$

As mentioned earlier, the regression lines 291 and 292 correspond to the lines $f_{201}(x)$ and $f_{202}(x)$. With the points of the side wall 201 only, the line $f_{201}(x)$ cannot be moved closer to the center line 251 in FIG. 3. At step S31, however, the inclination A is estimated using the points of the two side walls 201 and 202, based on which the line $f'_{201}(x)$ moved closer to the center line 251 can be obtained. The same applies to the line $f'_{202}(x)$ having the same inclination A. The lines $f'_{201}(x)$ and $f'_{202}(x)$ obtained at step S31 correspond to the detected walls mentioned at step S30.

After step S31, in order to narrow the space between the two lines $f'_{201}(x)$ and $f'_{202}(x)$ corresponding to the detected walls, the modifier 103 finds a point farthest away from the side wall 201 on the side wall 202 side from among the points $p_{201}(i)$. The points $p_{201}(i)$ that satisfy $y_{201}(i) < Ax_{201}(i) + B_{201}(i)$ are present on the line $f'_{202}(x)$ side with respect to the line $f'_{201}(x)$. The distance between the point $p_{201}(i)$ and line $f'_{201}(x)$ is denoted as $d_{201}(i)$, as expressed in Equation (9).

$$d_{201}(i) = \frac{|y_{201}(i) - (Ax_{201}(i) + B_{201})|}{\sqrt{A^2 + 1}} \quad (9)$$

As shown below in Equations (10) and (11), an index $I_{201}$ indicating the point $p_{201}(i)$ that represents the maximum value $D_{201}(i)$ can be obtained based on the distance $D_{201}(i)$ between the line $f'_{201}(x)$ and the point $p_{201}(i)$ that satisfies $y_{201}(i) < Ax_{201}(i) + B_{201}(i)$ Of the points $p_{201}(i)$ the index $I_{201}$ indicates a point that is farthest away from the side wall 201 on the side wall 202 side.

$$D_{201}(i) = \begin{cases} d_{201}(i) & \mathrm{if}(y_{201}(i) < (Ax_{201}(i) + B_{201})) \\ 0 & \mathrm{otherwise} \end{cases} \quad (10)$$

$$I_{201} = \underset{i}{\mathrm{argmax}}\, D_{201}(i) \quad (11)$$

Using the index 1201, the modifier 103 obtains a model $f''_{201}(x)$ for the modified wall 104 in which the line $f'_{201}(x)$ is moved closer to the side wall 202 side, as expressed below in Equation (12).

$$f''_{201}(x) = Ax + B'_{201}, B'_{201} = y_{201}(I_{201}) - Ax_{201}(I_{201}) \quad (12)$$

Similarly, the modifier 103 obtains a model $f''_{202}(x)$ for the modified wall 104 from the points $p_{202}(j)$ on the side wall 202, in which the line $f'_{202}(x)$ is moved closer to the side wall 201 side, as expressed below in Equations (13) to (16) (step S41).

$$d_{202}(j) = \frac{|y_{202}(j) - (Ax_{202}(j) + B_{202})|}{\sqrt{A^2 + 1}} \quad (13)$$

$$D_{202}(j) = \begin{cases} d_{202}(j) & \mathrm{if}(y_{202}(j) > (Ax_{202}(j) + B_{202})) \\ 0 & \mathrm{otherwise} \end{cases} \quad (14)$$

-continued $$I_{202} = \underset{i}{\operatorname{argmax}} d_{202}(j) \quad (15)$$

$$f''_{202}(x) = Ax + B'_{202}, B'_{202} = y_{202}(I_{202}) - Ax_{202}(I_{202}) \quad (16)$$

In the models $f''_{201}(x)$ and $f''_{202}(x)$ obtained for the modified walls 104 at step S41, the two lines $f'_{201}(x)$ and $f'_{202}(x)$ corresponding to the detected walls are moved in parallel up to the respective innermost points as schematically illustrated in FIG. 7. Thus, no point of the side wall 201 or side wall 202 exists between the modified walls 104. As a result, as long as the circumscribed rectangle of the transport vehicle 300 moves within the region defined by the models $f''_{201}(x)$ and $f''_{202}(x)$, the transport vehicle 300 will not come into contact with the side wall 201 or 202 of the container 200. Furthermore, with the models $f''_{201}(x)$ and $f''_{202}(x)$ of the modified walls 104 being parallel to the detected walls modeled by two parallel lines, the region defined by the modified walls 104 will not become narrowed in the rear of the container 200. The models $f''_{201}(x)$ and $f''_{202}(x)$ of the modified walls 104, which are modeled modified walls 104, may also be referred to as modified walls 104. In any case, the transport vehicle 300 can proceed between the modified walls 104 obtained at step S41 without coming into contact with the side wall 201 or 202.

After step S41, the wall detection device 100 determines whether or not the wall detection is completed (step S50), and the operations at steps S10 to S50 are repeated until the wall detection is completed.

According to the first embodiment, the acquirer 101 acquires a point cloud, which includes a series of coordinates of points corresponding to the first wall and second wall opposing each other, as described above. Based on the models and the acquired point clouds, the detector 102 detects the first detected wall corresponding to the first plane and the second detected wall corresponding to the second plane. The model represents the first plane showing the geometry of the first wall and the second plane showing the geometry of the second wall and also represents the first plane and second plane being parallel to each other. With a structure for detecting the first detected wall and second detected wall modeled to be parallel to each other, the risk of an accidental contact with the wall surface can be reduced when entering an area surrounded by wall whose surface is not flat. In addition, since a model of the container 200 is used in which the contour of the side wall 201 is parallel to the contour of the side wall 202, the first and second detected walls can be accurately detected even if the side walls 201 and 202 are formed of corrugated panels having projections and depressions. Furthermore, even if the wall surface includes a door knob or projections and depressions as in a corrugated panel and it is difficult to model the accurate contour of the wall surface in advance, the movable range of the transport vehicle 300 without contact with the wall surface can be calculated from the data obtained by measuring the wall surface with a sensor. For instance, the movable range for the transport vehicle 300 may be calculated as a range defined by the first and second detected walls.

According to the first embodiment, a series of two-dimensional coordinates are adopted, and the model represents the first plane and second plane being in parallel to each other when the first line indicating the horizontal cross section of the first plane and the second line indicating the horizontal cross section of the second plane have the same inclination. Thus, a model indicating parallel planes can be readily implemented.

Furthermore, according to the first embodiment, the detector 102 detects the first plane from multiple points corresponding to the first wall and the second plane from multiple points corresponding to the second wall, and corrects the first plane and second plane so as to be parallel to each other, thereby obtaining the first detected wall and second detected wall. For the operation of detecting the first plane and second plane before the correction, a method such as RANSAC and regression analysis may be adopted. Thus, the detector 102 can be readily implemented.

In particular, according to the first embodiment, the acquirer 101 includes a sensor which can measure a distance between itself and respective points so as to obtain a point cloud. The detector 102 sorts the point cloud into the first point cloud located within a predetermined distance from the first plane and the second point cloud located within a predetermined distance from the second plane, and associates the points in the first point cloud with the first wall and the points in the second point cloud with the second wall. The predetermined distance is larger than or equal to the larger value of either the tolerance of the sensor or the designed length of the projections and depressions in the first wall and second wall. Thereafter, the detector 102 detects the first detected wall and second detected wall, based on the model and the first point cloud and second point cloud. When associating the acquired point cloud with the first wall or second wall, a distance predetermined based on the tolerance of the sensor and the projections and depressions of the walls is adopted as a reference. This realizes a wall detection device suitable for the mounted sensor and the projections and depressions of the walls.

According to the first embodiment, the detector 102 is further provided with a modifier 103. The modifier 103 moves the first detected wall in parallel toward the second detected wall side to modify the first detected wall to a first modified wall, and moves the second detected wall in parallel toward the first detected wall side to modify the second detected wall to the second modified wall. Here, the number of points in the point cloud between the first modified wall and second modified wall is smaller than the number of points in the point cloud between the first detected wall and second detected wall. This means that, in comparison with an entry between the first and second detected walls, a risk of contact with the wall surface can be reduced in an entry between the first and second modified walls. According to the first embodiment, the operation for improving the accuracy in wall surface detection can be readily realized simply by moving the first and second detected walls in parallel. In contrast, with the existing method, the inclinations of the regression lines 291 and 292 need to be separately modified, and even after the modification, the regression lines 291 and 292 may not become parallel to each other. This means that the workload will increase in the operation for enhancing the accuracy of the wall surface detection.

According to the first embodiment, the modifier 103 moves the first detected wall in parallel up to the position of the point farthest away on the second detected wall side among the points corresponding to the first wall, and the second detected wall in parallel up to the position of the point farthest away on the first detected wall side among the points corresponding to the second wall. With the distance between the first modified wall and second modified wall being modified with reference to the innermost points, the risk of contact with the wall surface can be further reduced at the time of an entry between the first and second modified walls.

(Modification Example of First Embodiment) A modification example of the first embodiment will be described now. This modification example may be equally applicable to other embodiments described later.

According to the modification example of the first embodiment, the modifier 103 moves the detected walls based on the standard deviation of the frequency distribution of distances between the point cloud and detected wall.

In particular, the points of the point cloud obtained by the sensor of the acquirer 101 may be deviated by noise. If a simple calculation for the maximum value as in Equations (11) and (15) is adopted, the position of the modified wall 104 may vary due to the noise. When controlling the transport vehicle 300, it is preferable from the aspect of wall contact prevention to continuously operate the sensor so as to continuously measure the positions of the wall surfaces and thereby provide feedback on the amount and direction of the movement of the transport vehicle 300. However, if the position of the modified wall 104 exhibits a considerable change in time, this may adversely affect the control of the transport vehicle 300.

In view of the above, according to the modification example of the first embodiment, in order to stabilize the positions of the modified walls 104, the modifier 103 is adapted to move the detected walls based on the standard deviation of the frequency distribution of the distances between the point cloud and the detected walls.

Specifically, the modifier 103 moves the detected wall in parallel for a distance obtained by multiplying the standard deviation $\sigma$ of the occurrence frequency distribution of the distance $d_{201}(i)$ or $d_{202}(j)$ between the point cloud and a detected wall as expressed by Equations (9) and (13) by a predetermined positive constant of in order to generate a modified wall. When the length of the projections and depressions of the side walls 201 and 202 satisfies the condition of being sufficiently small with reference to the level of the sensor noise, the occurrence frequency distribution may approach a Gaussian distribution. With a Gaussian distribution, the probability that the random number generated will exceed a constant multiple of its standard deviation $\sigma$ can be calculated in advance. The risk of contact therefore can be controlled by adjusting the constant $\alpha$. However, if the length of the projections and depressions of the side walls 201 and 202 and the level of sensor noise do not satisfy the above condition, the modified walls 104 need to be obtained with some other method.

In this modification example, the parallel movement of the detected walls is not limited to the distance ($\alpha\sigma$) of the standard deviation $\sigma$ of the occurrence frequency distribution of the distances $d_{201}(i)$ and $d_{202}(j)$ multiplied by a predetermined positive constant $\alpha$. For instance, the detected walls may be moved in parallel by an average value L of the occurrence frequency distribution of the distances $d_{201}(i)$ and $d_{202}(j)$. Alternatively, the detected walls may be moved in parallel for a distance ($L+\alpha\sigma$) by adding this average value L to the distance obtained by multiplying the standard deviation $\sigma$ of the occurrence frequency distribution of the distances $d_{201}(i)$ and $d_{202}(j)$ by the predetermined positive constant $\alpha$. A variance V may be adopted in place of the standard deviation $\sigma$.

Second Embodiment

Next, a wall detection device and a transport vehicle according to the second embodiment will be described. In the following description, an overlapping explanation for the portions similar to the aforementioned structural components will be omitted, and a main focus will be placed on the portions that differ from the aforementioned ones.

According to the second embodiment, the modifier 103 is configured to extract points relevant to the projections on the side walls 201 and 202 so that the detected walls can be moved based on the average value of the distances between the extracted points and the detected walls. The amount of movement based on the average value of the distances may be the average value of the distances, or a value obtained by adding the constant multiple of the standard deviation or variance of the distribution of the distances to the average value of the distances.

In particular, the modifier 103 moves the first detected wall in parallel, based on the first average value of the first distances between the first detected wall and the points obtained on the second detected wall side with respect to the first detected wall among the points corresponding to the first wall. The modifier 103 further moves the second detected wall in parallel, based on the second average value of the second distances between the second detected wall and the points obtained on the first detected wall side with respect to the second detected wall among the points corresponding to the second wall.

Here, the modifier 103 may add the variance or standard deviation of the first distance multiplied by a predetermined positive constant to the first average value so that the first detected wall can be moved for an amount corresponding to the result of the addition. Similarly, the modifier 103 may add the variance or standard deviation of the second distance multiplied by a predetermined positive constant to the second average value so that the second detected wall can be moved for an amount corresponding to the result of the addition.

The points obtained on the second detected wall side with respect to the first detected wall among the points corresponding to the first wall may be a set of points extracted on the second detected wall side of an initial extraction boundary which is defined on the second detected wall side with respect to the first detected wall, and points interposed between the extracted points.

Similarly, the points obtained on the first detected wall side with respect to the second detected wall among the points corresponding to the second wall may be a set of points extracted on the first detected wall side of an initial extraction boundary which is defined on the first detected wall side with respect to the second detected wall, and points interposed between the extracted points.

The rest of the configuration is the same as that of the first embodiment.

Figure 8:
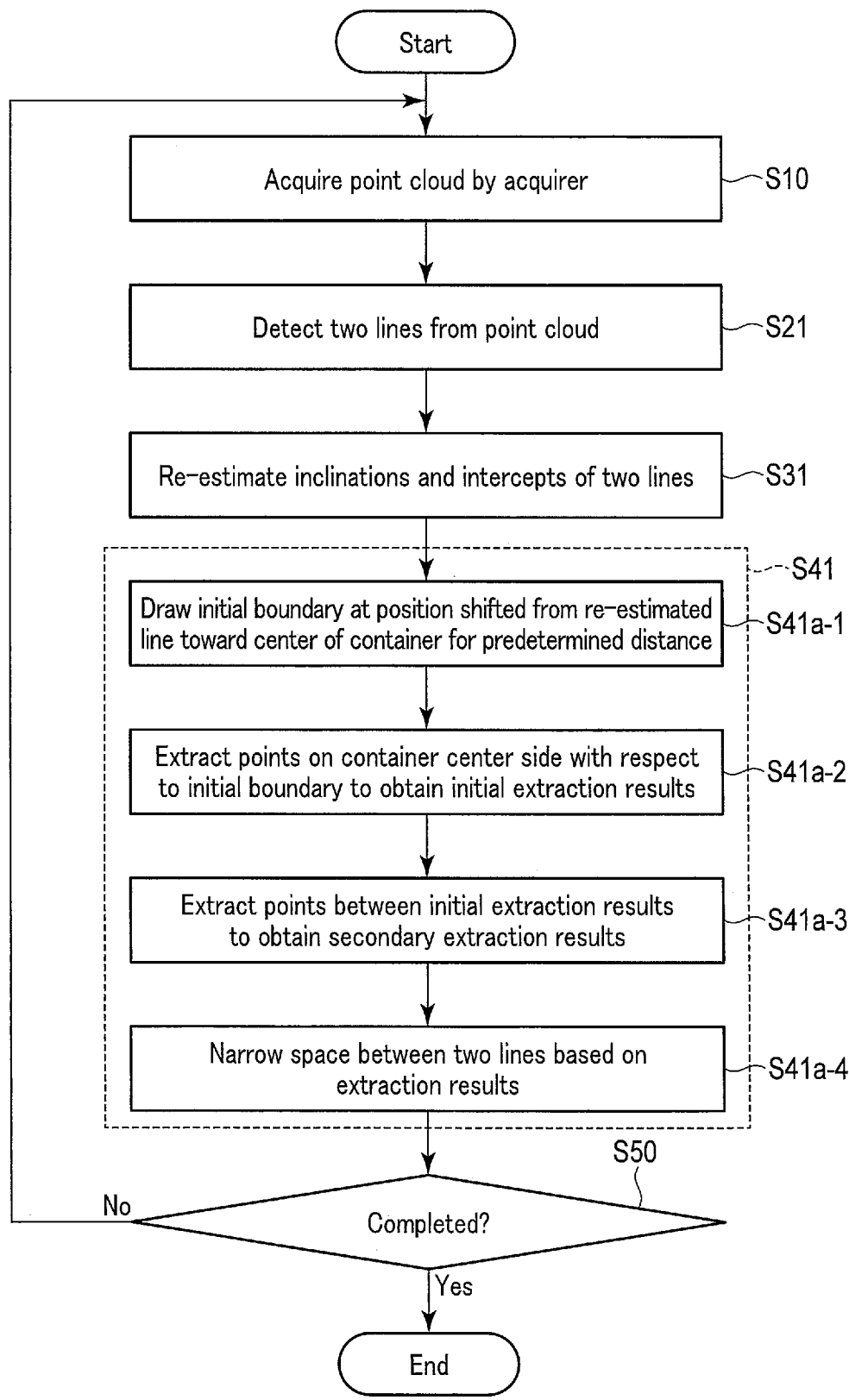
FIG. 8 is a flowchart explaining an operation according to the second embodiment.

Next, the operations of the wall detection device and transport vehicle configured as indicated above will be explained with reference to the flowchart of FIG. 8 and the diagrams of FIGS. 9 to 11. The operations at steps S41a-1 to S41a-4 with reference to FIGS. 9 to 11 will be described mainly in relation to the side wall 201 as an example. Similar operations will be executed in relation to the side wall 202.

Through the implementation of the operation at step S10 as mentioned earlier, the points $p_{201}(i)$ in the point cloud corresponding to the side wall 201 and the point $p_{202}(j)$ in the point cloud corresponding to the side wall 202 are obtained.

Through the implementation of the operations at steps S21 and S31 as mentioned earlier, two lines $f'_{201}(x)$ and $f'_{202}(x)$, which correspond to the detected walls, are detected.

Figure 9:
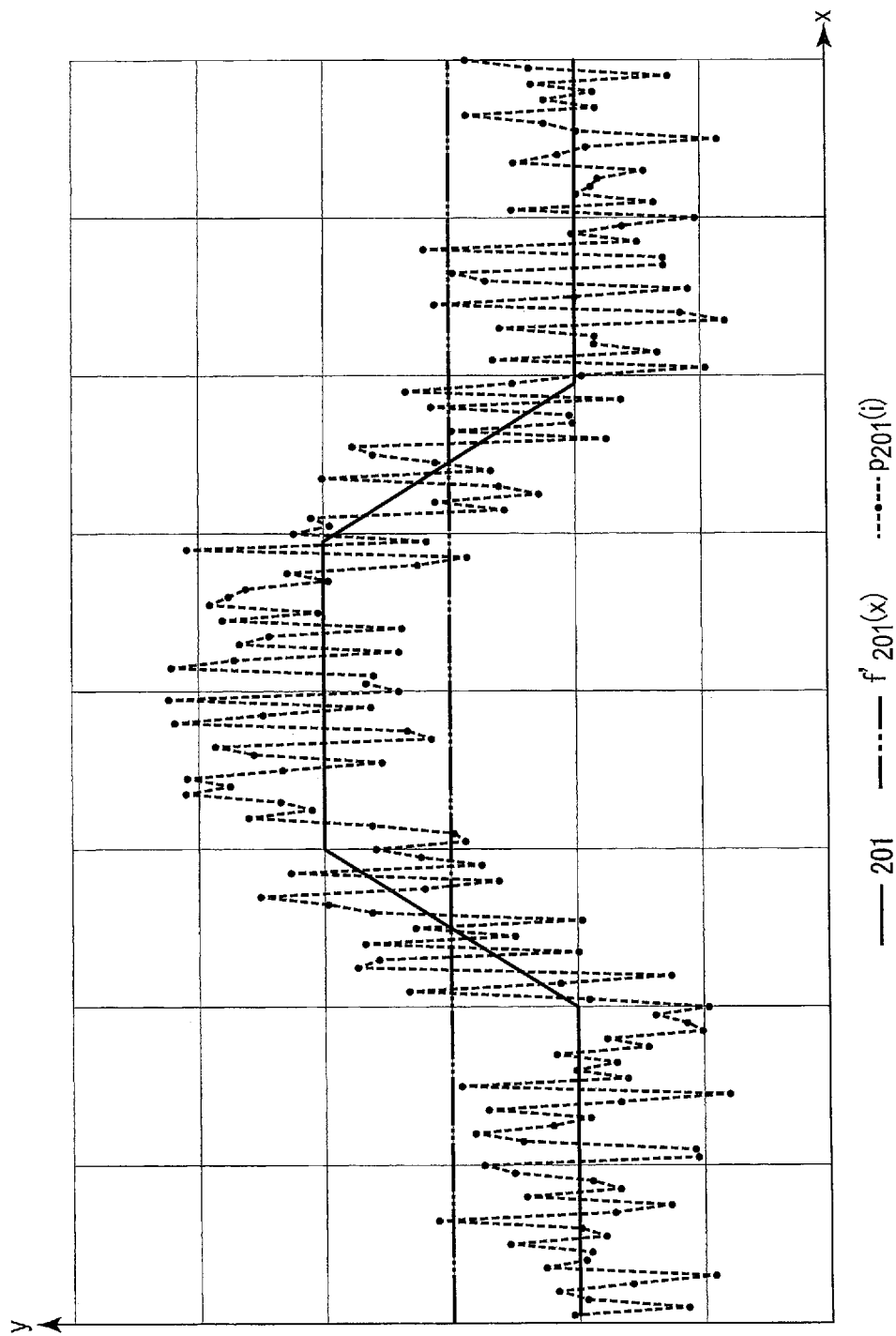
FIG. 9 is a diagram representing the relationship between a point cloud and side walls according to the second embodiment.

FIG. 9 is a diagram indicating the relationship between the point cloud and side wall 201 with an enlarged view of part of the side wall 201. This part of the side wall 201 represents the part closer to the laser range finder 101a, where the laser light 101b reaches the rear of a depression. The points $p_{201}(i)$ in the point cloud corresponding to the side wall 201 in FIG. 9 are detected in the vicinity of the surface of the side wall 201 with variations incurred by noise. The points $p_{201}(i)$ in the point cloud are provided with indices in accordance with the application angles of the laser range finder 101a, and are connected by dashed lines in the order of the indices. The line $f'_{201}(x)$ indicating a detected wall is obtained as a line that runs between the projections and depressions of the side wall 201. Because of the positions of the points $p_{201}(i)$ in the point cloud deviated by noise, a point obtained from a projection may be observed on the depression side beyond the detected wall, or a point obtained from a depression may be observed on the projection side.

In order to prevent contact of the transport vehicle 300 with the wall surface, it is ideal that the line connecting the projections of the side wall 201 be obtained as a modified wall. For this purpose, by removing the points obtained from any depressions of the side wall 201 from the points $p_{201}(i)$ in the point cloud, the points obtained only from the projections need to be selected (extracted). This selection may be based, for example, on whether a point $p_{201}(i)$ is positioned on the center side of the container with respect to the detected wall. If the level of the sensor noise is large with reference to the length of the projections and depressions of the side wall 201, points obtained from the depressions may be included on the center side of the container with respect to the detected wall, which may lead to an erroneous detection.

For this reason, after step S31, the modifier 103 obtains inner wall candidate points, which are a point cloud indicating the positions of projections of the side wall 201, moves the detected wall based on the inner wall candidate points, and obtains a modified wall that is an inner wall through steps S41a-1 to S41a-4, which form a modification example of step S41.

Figure 10:
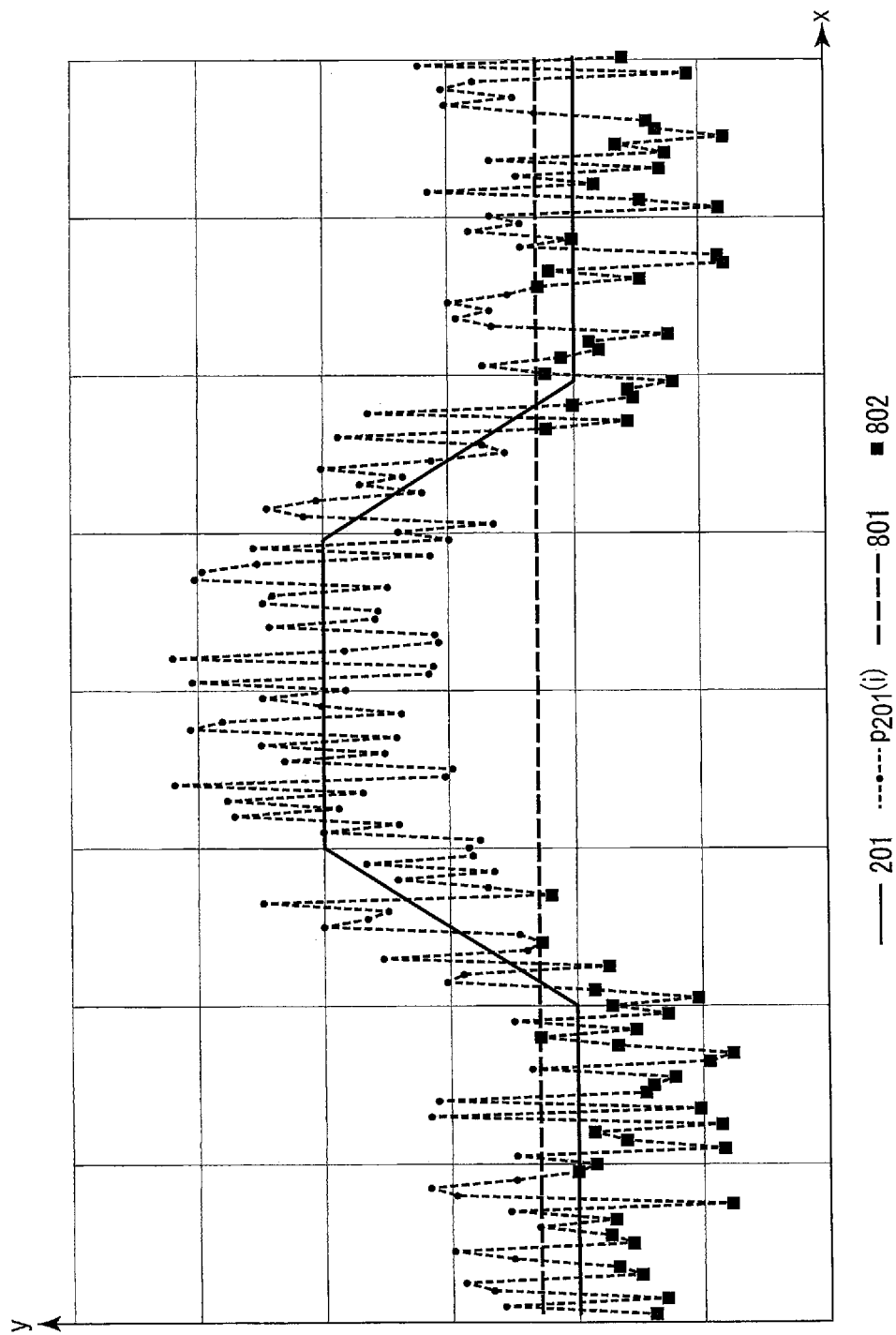
FIG. 10 is a diagram representing an initial extraction result according to the second embodiment.

In particular, the modifier 103 draws an initial boundary 801 at a position shifted from the line $f'_{201}(x)$ indicating the detected wall for a predetermined distance toward the center of the container, as shown in FIG. 10 (step S41a-1). In FIGS. 9 to 11, smaller y coordinates represent the side toward the center of the container.

After step S41a-1, the modifier 103 extracts, from the points $p_{201}(i)$ in the point cloud, points positioned on the side toward the center of the container with respect to the initial boundary 801 as initial extraction results 802 (step S41a-2).

Figure 11:
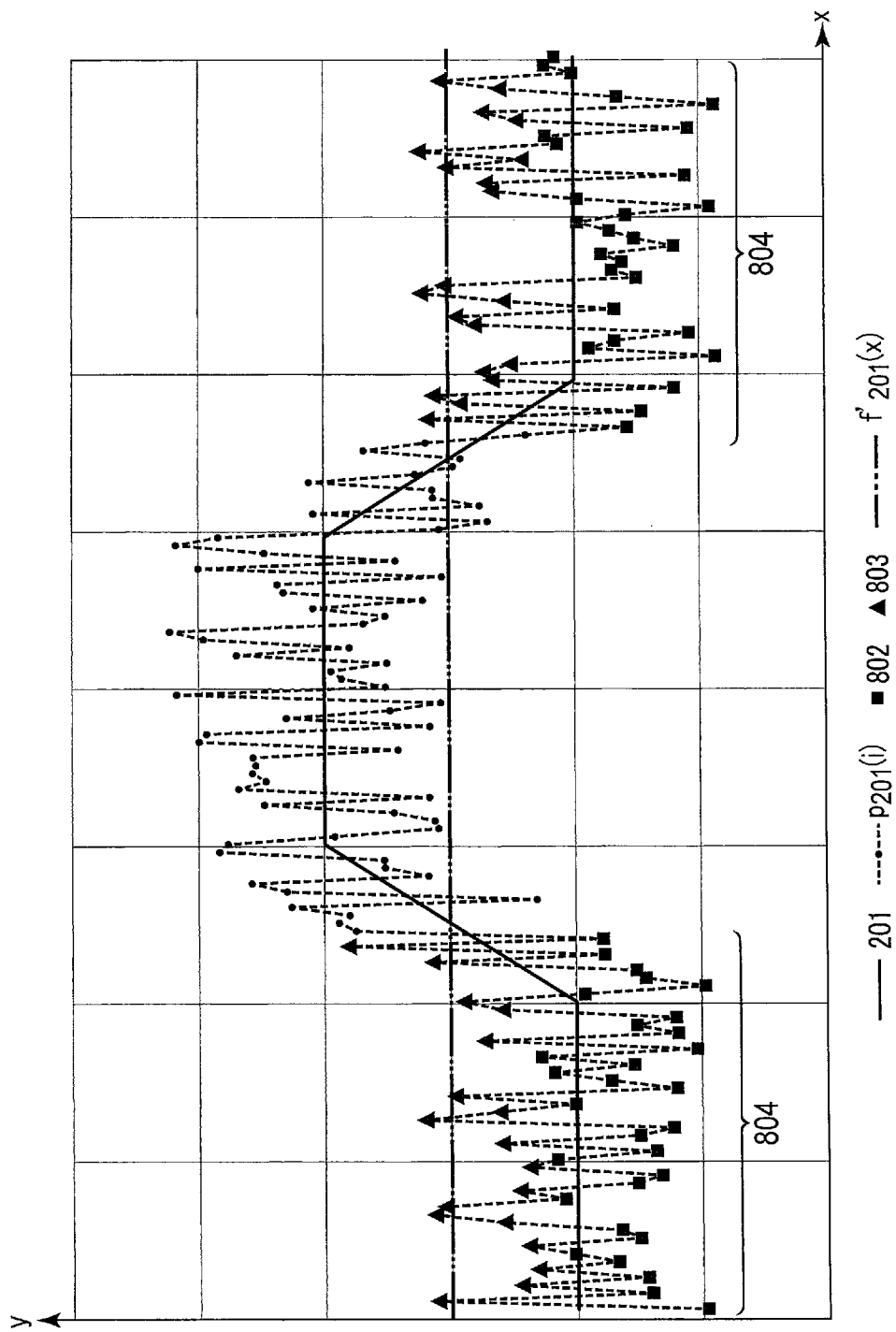
FIG. 11 is a diagram representing a secondary extraction result according to the second embodiment.

After step S41a-2, the modifier 103 extracts, from the points $p_{201}(i)$ in the point cloud, points interposed between the initial extraction results 802 (squared points) as secondary extraction results 803 (triangular points), as illustrated in FIG. 11 (step S41a-3). Here, a secondary extraction result 803 is regarded as being interposed between any two initial extraction results 802 when one of the two points of the initial extraction results 802 is included in a range defined by horizontally shifting the other one of the points of the initial extraction results 802 by a predetermined threshold value along the dashed line. The modifier 103 further acquires, as extraction results 804, inner wall candidate points representing the positions of the projections of the indicating side wall 201. The extraction results 804 include the points of the initial extraction results 802 and points of the secondary extraction results 803. The operations at steps S41a-1 to S41a-3 are not limited to the side wall 201, but will also be executed for the side wall 202 in a similar manner.

After step S41a-3, the modifier 103 shortens the distance between the two lines $f'_{201}(x)$ and $f'_{202}(x)$ indicating the detected walls based on the extraction results 804 (step S41a-4), and thereby obtains models $f''_{201}(x)$ and $f''_{202}(x)$ for the modified walls 104.

For instance, the modifier 103 calculates the first average value L1 of the distribution P1 of the first distances between the extraction results 804 relevant to the side wall 201 and the detected wall ($f'_{201}(x)$), and moves the detected wall in parallel toward the center of the container by the first average value L1. Similarly, the modifier 103 calculates the second average value L2 of the distribution P2 of the second distances between the extraction results 804 relevant to the side wall 202 and the detected wall ($f'_{202}(x)$), and moves the detected wall in parallel toward the center of the container by the second average value L2. In this manner, the modified walls 104 that stably run in the vicinity of the projections of the side walls 201 and 202 can be obtained.

Alternatively, the modifier 103 may calculate the standard deviation σ1 of the distribution P1, add the standard deviation σ1 multiplied by a predetermined positive constant α to the first average value L1, and move the detected wall in parallel by the result of the addition (L1+α·σ1, where α=2 or 3, for example). Similarly, the modifier 103 may calculate the standard deviation σ2 of the distribution P2, add the standard deviation σ2 multiplied by a predetermined positive constant α to the second average value L2, and move the detected wall in parallel by the result of the addition (L2+ α·σ2). By adding a constant multiple of the standard deviation to the average value, the risk of a collision with the wall surface can be further reduced. A variance V may be adopted in place of the standard deviation σ.

After step S41a-4, step S50 is implemented in the same manner as mentioned earlier.

According to the second embodiment, the modifier 103 moves the first detected wall in parallel, based on the first average value of the first distances between the first detected wall and the points obtained on the second detected wall side with respect to the first detected wall from among the points corresponding to the first wall. The modifier 103 also moves the second detected wall in parallel, based on the second average value of the second distances between the second detected wall and the points obtained on the first detected wall side with respect to the second detected wall from among the points corresponding to the second wall.

With a configuration of performing a parallel movement using an average value in place of the maximum value expressed by Equations (11) and (15), the influence of noise upon the movement amount of the detected wall can be suppressed. Thus, in addition to the effect of the first embodiment, the position of the modified wall 104 can be stabilized.

According to the second embodiment, the modifier 103 may add the variance or standard deviation of the first distance multiplied by a predetermined positive constant to the first average value, and move the first detected wall by an amount corresponding to the result of the addition.

Similarly, the modifier 103 may add the variance or standard deviation of the second distance multiplied by a predetermined positive constant to the second average value, and move the second detected wall by an amount corresponding to the result of the addition. Thus, in addition to the aforementioned effects, the risk of a collision with the wall surface can be further reduced.

According to the second embodiment, the points obtained on the second detected wall side with respect to the first detected wall from among the points corresponding to the first wall may be a set of points extracted on the second detected wall side of the initial extraction boundary, which is defined on the second detected wall side with respect to the first detected wall, and points interposed between the extracted points. Similarly, the points obtained on the first detected wall side with respect to the second detected wall among the points corresponding to the second wall may be a set of points extracted on the first detected wall side of an initial extraction boundary, which is defined on the first detected wall side with respect to the second detected wall, and points interposed between the extracted points. Thus, in addition to the aforementioned effect, the configuration for extracting points from the projections of the side walls 201 and 202 can further suppress the influence of noise upon the movement amount of the detected wall.

Modification Examples of First and Second Embodiments

The first and second embodiments may be modified in the manners indicated below.

According to the first and second embodiments, two parallel lines $f'_{201}(x)$ and $f'_{202}(x)$ obtained by modeling the side walls 201 and 202 are used, which is not a limitation. For instance, in addition to the two lines $f'_{201}(x)$ and $f'_{202}(x)$, the rear wall of the container may be modeled to the third line $f'_{203}(x)$, which has end points in the vicinity of the rear ends of the two lines $f'_{201}(x)$ and $f'_{202}(x)$. In this case, with regard to the two functions in Equations (5), the following Equation (17) may be incorporated.

$$f'_{203}(x) = -\frac{x}{a'} + b'_{203} \quad (17)$$

In other words, the model represents, in addition to the aforementioned first and second planes, the third plane orthogonal to the rear end of the first plane and the rear end of the second plane. The detector 102 detects the first detected wall, the second detected wall, and the third detected wall corresponding to the third plane, based on the model and the acquired point cloud. Thus, in addition to the effects of the first and second embodiments, the risk of contact with the rear wall can be reduced. For instance, control of outputting an alert or stopping the entry of the transport vehicle 300 may be possible when the distance to the third detected wall that is the rear wall reaches the threshold value or less.

According to the first and second embodiments, the side walls 201 and 202 are mounted, and the first detected wall and second detected wall corresponding to these side walls 201 and 202 are detected, which is not a limitation. For instance, in the situation where the distance between the two walls of the container is known, if the distance between the detected walls significantly differs from the known distance, the result of the determination may be output as an absence of a container. In place of the determination of the presence/absence of a container, the presence/absence of an aisle may be determined. In other words, if the distance between the first detected wall and second detected wall is larger than or equal to a threshold value, the detector 102 outputs an absence of a container or aisle having the first wall and second wall. Thus, in addition to the effects of the first and second embodiments, the calculation for modification of the detected walls to the modified walls and the control of the transport vehicle 300 can be omitted, reducing the load of the operations.

According to the first and second embodiments, detection of a single combination of the first detected wall and second detected wall is described, which is not a limitation. That is, several combinations may be detected for the first detected wall and second detected wall. For instance, when several combinations are obtained for the first detected wall and second detected wall, the detector 102 may select a combination including the longest line segment from among the combinations to detect the first detected wall and second detected wall. In this manner, in addition to the effect of the first and second embodiments, the first and second detected walls can be selected from a limited number of choices that have been narrowed down.

According to the first and second embodiments, the acquirer 101 adopts a laser range finder 101a configured to acquire a group of two-dimensional points, which is not a limitation. For instance, the acquirer 101 may adopt a sensor such as a time-of-flight (ToF) camera capable of acquiring a group of three-dimensional points. In this case, the model of two walls represents a three-dimensional plane model, and instead of the coefficient a' shared for x between the models as in Equations (5), a constraint of the normal vectors of the three-dimensional planes being parallel to each other is introduced. In other words, the point cloud includes a series of three-dimensional coordinates, and the model represents the first plane and second plane being parallel to each other, with the normal vector of the first plane being the same as the normal vector of the second plane. With this method, the container can be dealt with as a parallelepiped, by modeling the ceiling and floor of the container, in addition to the rear wall mentioned earlier in the modification example, as planes. Conversely, for a warehouse or the like, detected walls can be reduced to the minimum of two walls by using two mutually orthogonal walls for the model based on the corners of the warehouse. If two or more planes and geometrical constraints relative to the arrangement of the planes are known, a modification example can be implemented.

Figure 12:
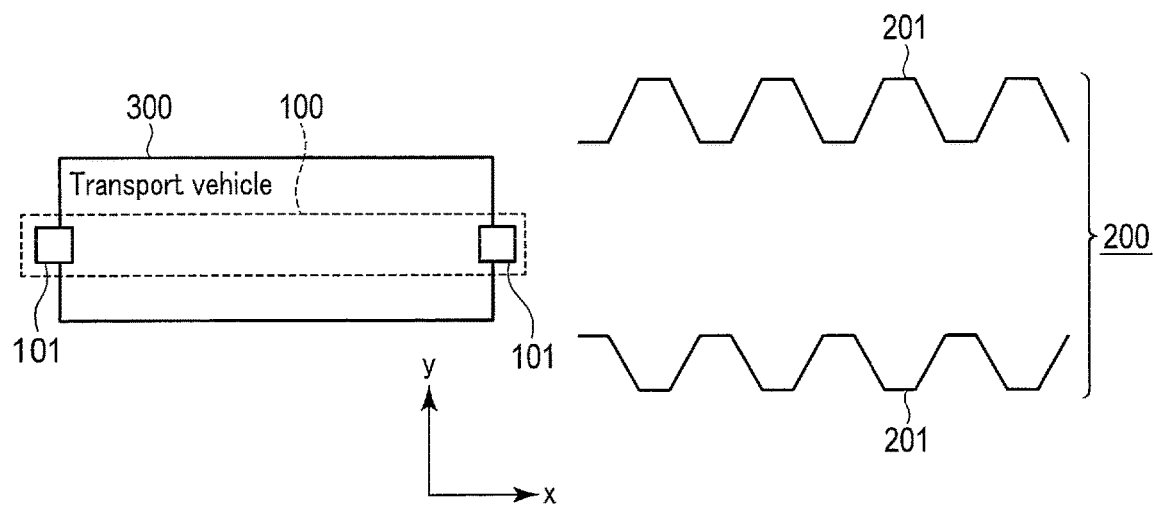
FIG. 12 is a plan view showing a transport vehicle equipped with a wall detection device and the state of use of the vehicle according to a modification example of the first and second embodiments.
Figure 13:
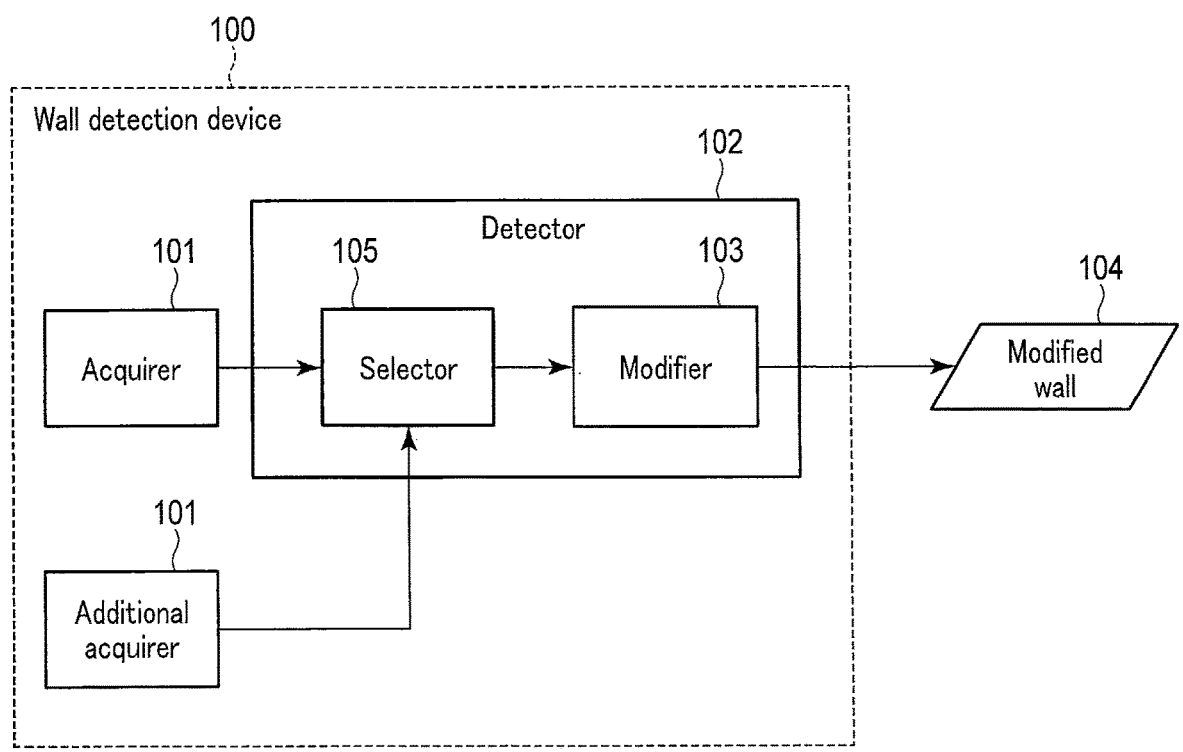
FIG. 13 is a block diagram showing the configuration of the wall detection device according to the modification example of the first and second embodiments.

In the above embodiments, a single acquirer 101 is mounted at the front of the transport vehicle 300, which is not a limitation. For instance, another acquirer 101 may be mounted at the rear of the transport vehicle 300 in addition to the one at the front of the transport vehicle 300. Alternatively, yet another acquirer 101 may be mounted in some other portion of the transport vehicle 300 in addition to the front and rear of the transport vehicle 300. For instance, as illustrated in FIGS. 12 and 13, the wall detection device 100 may be further provided with an additional acquirer 101 and a selector 105 in the detector 102. This acquirer 101 is arranged in a direction opposite (i.e., at the rear end) the aforementioned acquirer 101 arranged at the center front of the transport vehicle 300 in the traveling direction, and is configured to obtain the point cloud including a series of coordinates of the points corresponding to the first wall and second wall. With this arrangement, the detector 102 detects a plurality of combinations for the first detected wall and second detected wall, based on the point cloud acquired by the acquirer 101 and the point cloud acquired by the other acquirer 101. The selector 105 selects a combination of detected walls having the largest length from the detected combinations. The detector 102 detects the selected combination of the first detected wall and second detected wall. In this manner, a detected wall is acquired from the point cloud acquired by each of the acquirers 101, and the longest detected wall is selected to be used as the detection result.

Thus, automated switching of the acquirers 101 can be realized during the entry of a container.

The embodiments are not limited to a configuration for embodying the wall detection device 100 as a specialized device. The wall detection device 100 may be embodied as a computer such as a personal computer (PC) in which programs for implementing algorithms of respective embodiments are installed. An example of the wall detection device 100 realized in the form of a computer will be described below in the third embodiment.

Third Embodiment

FIG. 14 is a block diagram showing an exemplary hardware configuration of a wall detection device according to the third embodiment. The third embodiment is a specific example of the first and second embodiments, in which the detector 102 connected to the acquirer 101 is realized by a computer.

The wall detection device 100 includes, as a hardware structure, a Central Processing Unit (CPU) 11, a Random Access Memory (RAM) 12, a program memory 13, an auxiliary storage device 14, and an input/output interface 15. The CPU 11 communicates with the RAM 12, program memory 13, auxiliary storage device 14, and input/output interface 15 via a bus. That is, the wall detection device 100 according to the present embodiment is realized by a computer with such a hardware structure.

The CPU 11 is an example of a general-purpose processor. The RAM 12 is used by the CPU 11 as a working memory. The RAM 12 includes a volatile memory such as a Synchronous Dynamic Random Access Memory (SDRAM). The program memory 13 stores a program for realizing the units corresponding to the respective embodiments. The program may be a program for realizing different functions of the aforementioned detector 102 on the computer. Some of the functions of the detector 102 may be functions of the modifier 103 or of the selector 105. Furthermore, as a program memory 13, part of or a combination of the Read-Only Memory (ROM) and auxiliary storage device 14 may be adopted. The auxiliary storage device 14 is configured to temporarily store data. The auxiliary storage device 14 may include a non-volatile memory such as a hard disc drive (HDD) or solid state drive (SSD).

The input/output interface 15 is for establishing a connection with other devices including the sensor that serves as the acquirer 101. As illustrated in FIG. 15, the input/output interface 15 may be for establishing a connection with other devices including sensors that serve as other acquirers 101 in addition to the sensor that serves as the acquirer 101. The input/output interface 15 is used for connections with sensors, a keyboard, a mouse, and a display.

The program stored in the program memory 13 includes computer-executable commands. Upon an implementation by the CPU 11, which is a processing circuitry, the program (computer-executable commands) causes the CPU 11 to execute a certain operation. For instance, upon the implementation by the CPU 11, the program causes the CPU 11 to execute a series of operations as described with reference to the components in FIG. 3. For instance, upon the implementation of a computer-executable command in the program, the command causes the CPU 11 to execute the wall detection method. The wall detection method may include respective steps corresponding to the aforementioned functions of the acquirer 101 and detector 102. The wall detection method may also suitably include the steps indicated in FIGS. 4, 5, and 8.

The program may be provided to the wall detection device, which is a computer, in a form of being stored in a computer-readable storage medium. If this is the case, the wall detection device may further include a drive (not shown) for reading data from the storage medium to obtain the program from the storage medium. Examples of the storage media include a magnetic disk, an optical disk (e.g., CD-ROM, CD-R, DVD-ROM, and DVD-R), a magneto-optical disk (e.g., MO), and a semiconductor memory. The storage medium may also be referred to as a non-transitory computer readable storage medium. Alternatively, the program may be stored in a server on a communication network so that the wall detection device can download the program from the server by means of the input/output interface 15.

The processing circuitry for implementing the program is not limited to a general-purpose hardware processor such as a CPU 11, and a specialized hardware processor such as an Application Specific Integrated Circuit (ASIC) may be adopted. The processing circuitry (processor) includes at least one general-purpose hardware processor, at least one specialized hardware processor, or a combination of at least one general-purpose hardware processor and at least one specialized hardware processor. In the examples of FIGS. 14 and 15, the CPU 11, RAM 12, and program memory 13 correspond to the processing circuitry.

According to at least one embodiment described above, the risk of an accidental contact with a wall surface can be reduced when entering a region surrounded by wall surfaces whose contour may not be simple.

While several embodiments have been described, they are presented merely as examples, and are not intended to limit the scope of the inventions. Indeed, these embodiments may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit.

What is claimed is:

1. A self-propelled transport vehicle comprising:
   a wall detection device; and
   a controller,
   the wall detection device comprising
      an acquirer configured to acquire a point cloud, which includes a series of coordinates of a plurality of points corresponding to a first wall and a second wall that oppose each other; and
      processing circuitry configured to detect a first detected wall and a second detected wall based on a model and the acquired point cloud, the model representing a first plane which corresponds to the first detected wall and indicates a surface of the first wall and a second plane which corresponds to the second detected wall and indicates a surface of the second wall, and the model representing the first plane and the second plane being parallel to each other, wherein
   the processing circuitry is configured to:
      modify the first detected wall by moving the first detected wall in parallel toward a side of the second detected wall to obtain a first modified wall; and
      modify the second detected wall by moving the second detected wall in parallel toward a side of the first detected wall to obtain a second modified wall,
   a number of points in the point cloud between the first modified wall and the second modified wall is smaller than a number of points in the point cloud between the first detected wall and the second detected wall, and the controller is configured to control, based on the first modified wall and the second modified wall obtained by the wall detection device, orientation of a wheel corresponding to a traveling direction so as to avoid contact with a wall surface.

2. The self-propelled transport vehicle according to claim 1, wherein the processing circuitry detects the first plane from the points corresponding to the first wall and the second plane from the points corresponding to the second wall, corrects the first plane and the second plane in such a manner as to be in parallel to each other, and thereby detects the first detected wall and the second detected wall.

3. The self-propelled transport vehicle according to claim 1, wherein the processing circuitry is configured to:

move the first detected wall in parallel up to a position of a point farthest away on the side of the second detected wall from among the points corresponding to the first wall; and move the second detected wall in parallel up to a position of a point farthest away on the side of the first detected wall from among the points corresponding to the second wall.

4. The self-propelled transport vehicle according to claim 1, wherein the model further represents a third plane orthogonal to a rear end of the first plane and to a rear end of the second plane, and the processing circuitry detects the first detected wall, the second detected wall, and a third detected wall corresponding to the third plane, based on the model and the acquired point cloud.

5. The self-propelled transport vehicle according to claim 1, wherein when a plurality of combinations of the first detected wall and the second detected wall are obtained, the processing circuitry selects a combination having a longest line segment from the plurality of combinations and thereby detects the first detected wall and the second detected wall.

6. The self-propelled transport vehicle according to claim 1, wherein the series of coordinates are two-dimensional coordinates, and the model represents the first plane and the second plane being parallel to each other when an inclination of a first line representing a horizontal cross section of the first plane and an inclination of a second line representing a horizontal cross section of the second plane are equal to each other.

7. The self-propelled transport vehicle according to claim 1, wherein the series of coordinates are three-dimensional coordinates, and the model represents the first plane and the second plane being parallel to each other when a normal vector of the first plane and a normal vector of the second plane are identical.

8. The self-propelled transport vehicle according to claim 1, wherein the wall detection device further comprises another acquirer arranged in an opposite direction with respect to the acquirer and configured to acquire a point cloud including a series of coordinates of points corresponding to the first wall and the second wall, and the processing circuitry is configured to detect a plurality of combinations for the first detected wall and the second detected wall based on the point cloud acquired by the acquirer and the point cloud acquired by the other acquirer;

select a combination having a longest detected wall from the combinations; and detect the first detected wall and the second detected wall in the selected combination.

9. The self-propelled transport vehicle according to claim 1, wherein the processing circuitry is configured to:

move the first detected wall in parallel based on a first average value of first distances between the first detected wall and a plurality of points acquired on the side of the second detected wall with respect to the first detected wall from among the points corresponding to the first wall; and move the second detected wall in parallel based on a second average value of second distances between the second detected wall and a plurality of points acquired on the side of the first detected wall with respect to the second detected wall from among the points corresponding to the second wall.

10. The self-propelled transport vehicle according to claim 9, wherein the processing circuitry is configured to:

add to the first average value a value obtained by multiplying a variance or a standard deviation of the first distances by a predetermined positive constant to obtain a first resultant value of addition, and move the first detected wall in parallel by the first resultant value; and add to the second average value a value obtained by multiplying a variance or a standard deviation of the second distances by a predetermined positive constant to obtain a second resultant value of addition, and move the second detected wall in parallel by the second resultant value.

11. A self-propelled transport vehicle, comprising:

a wall detection device; and a controller, the wall detection device comprising an acquirer configured to acquire a point cloud, which includes a series of coordinates of a plurality of points corresponding to a first wall and a second wall that oppose each other; and processing circuitry configured to detect a first detected wall and a second detected wall based on a model and the acquired point cloud, the model representing a first plane which corresponds to the first detected wall and indicates a surface of the first wall and a second plane which corresponds to the second detected wall and indicates a surface of the second wall, and the model representing the first plane and the second plane being parallel to each other, wherein the controller is configured to control, based on the first detected wall and the second detected wall detected by the wall detection device, orientation of a wheel corresponding to a traveling direction so as to avoid contact with a wall surface, the acquirer includes a sensor, and acquires the point cloud by measuring a distance between the sensor and the respective points by means of the sensor, the processing circuitry sorts the points in the point cloud into a first point cloud that includes a plurality of points which are present within a predetermined distance from the first plane and a second point cloud that includes a plurality of points within the predetermined distance from the second plane, associates the points in the first point cloud with the first wall and the points in the second point cloud with the second wall, and detects the first detected wall and the second detected wall based on the first point cloud, the second point cloud, and the model, and the predetermined distance is larger than or equal to a larger one of a tolerance of the sensor and a designed length of projections and depressions in the first wall and the second wall.

12. A self-propelled transport vehicle, comprising:
a wall detection device; and
a controller
the wall detection device comprising
   an acquirer configured to acquire a point cloud, which includes a series of coordinates of a plurality of points corresponding to a first wall and a second wall that oppose each other; and
   processing circuitry configured to detect a first detected wall and a second detected wall based on a model and the acquired point cloud, the model representing a first plane which corresponds to the first detected wall and indicates a surface of the first wall and a second plane which corresponds to the second detected wall and indicates a surface of the second wall, and the model representing the first plane and the second plane being parallel to each other, wherein
the controller is configured to control, based on the first detected wall and the second detected wall detected by the wall detection device, orientation of a wheel corresponding to a traveling direction so as to avoid contact with a wall surface, and when a distance between the first detected wall and the second detected wall is larger than or equal to a threshold value, the processing circuitry outputs that there is no container or aisle having the first wall and the second wall.

13. A control method performed by a self-propelled transport vehicle comprising a wall detection device and a controller, the control method comprising:
   acquiring, by the wall detection device, a point cloud, which includes a series of coordinates of points corresponding to a first wall and a second wall that oppose each other;
   detecting, by the wall detection device, a first detected wall corresponding to a first plane and a second detected wall corresponding to a second plane based on a model and the acquired point cloud, the model representing the first plane indicating a surface of the first wall and the second plane indicating a surface of the second wall, and the model representing the first plane and the second plane being parallel to each other;
   modifying the first detected wall by moving the first detected wall in parallel toward a side of the second detected wall to obtain a first modified wall;
   modifying the second detected wall by moving the second detected wall in parallel toward a side of the first detected wall to obtain a second modified wall,
   wherein a number of points in the point cloud between the first modified wall and the second modified wall is smaller than a number of points in the point cloud between the first detected wall and the second detected wall; and
   controlling, by the controller and based on the first modified wall and the second modified wall obtained by the wall detection device, orientation of a wheel corresponding to a traveling direction so as to avoid contact with a wall surface.

* * * * *